Sept. 5, 1967 C. E. CHRISTMAN ETAL 3,339,601
APPARATUS FOR WOODEN DOORS AND DOORJAMBS
Filed May 7, 1965
7 Sheets-Sheet 1
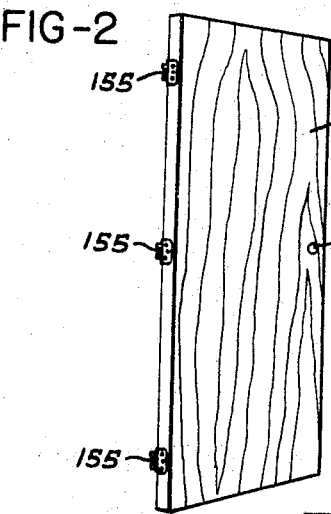
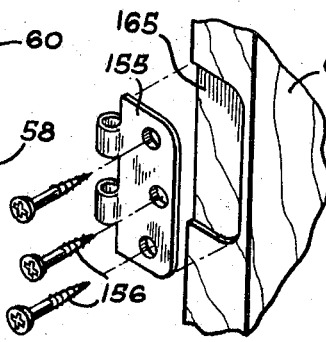
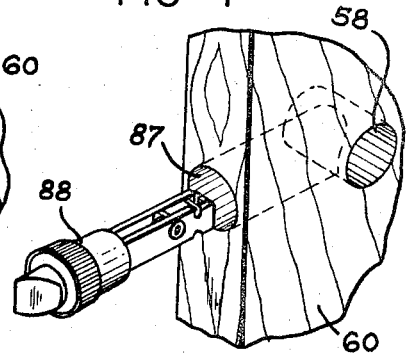
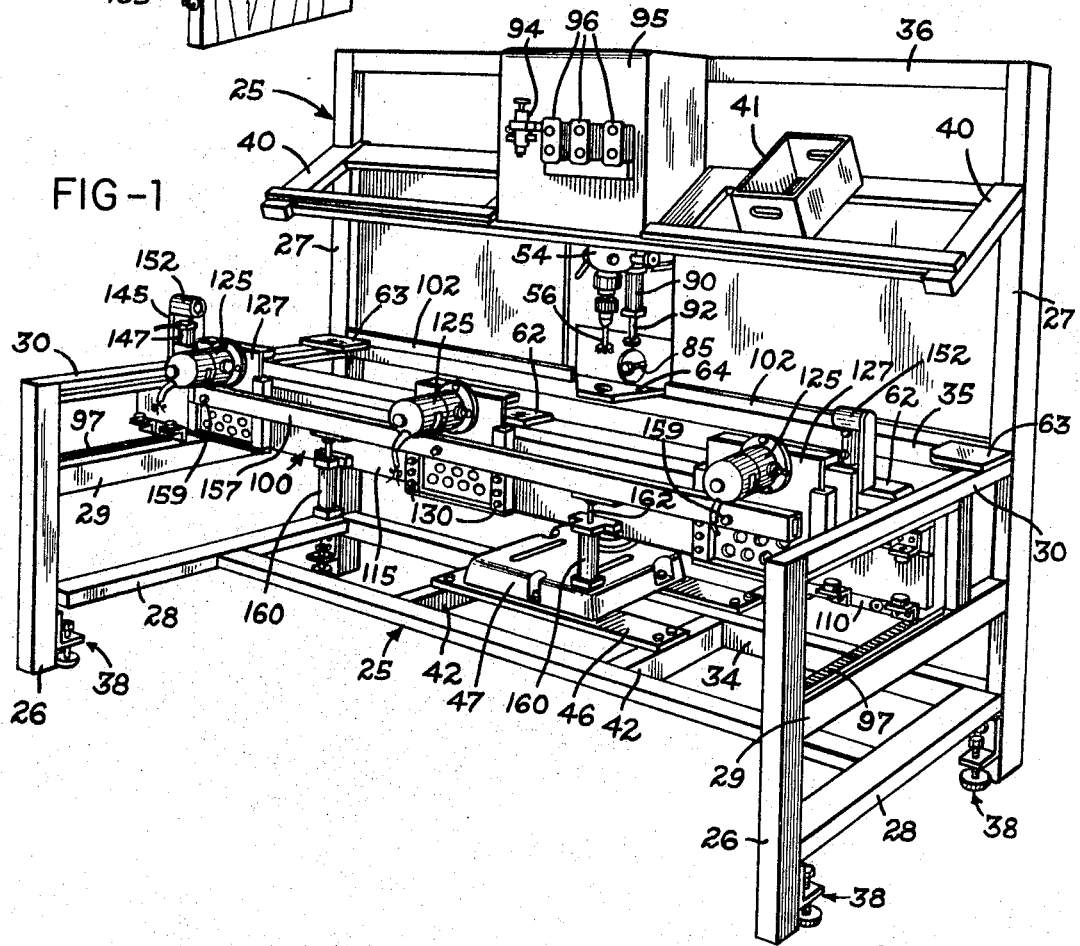
INVENTORS
CARL E. CHRISTMAN &
THOMAS S. FERGUSON
Marechal, Biebel, French & Bugg
ATTORNEYS

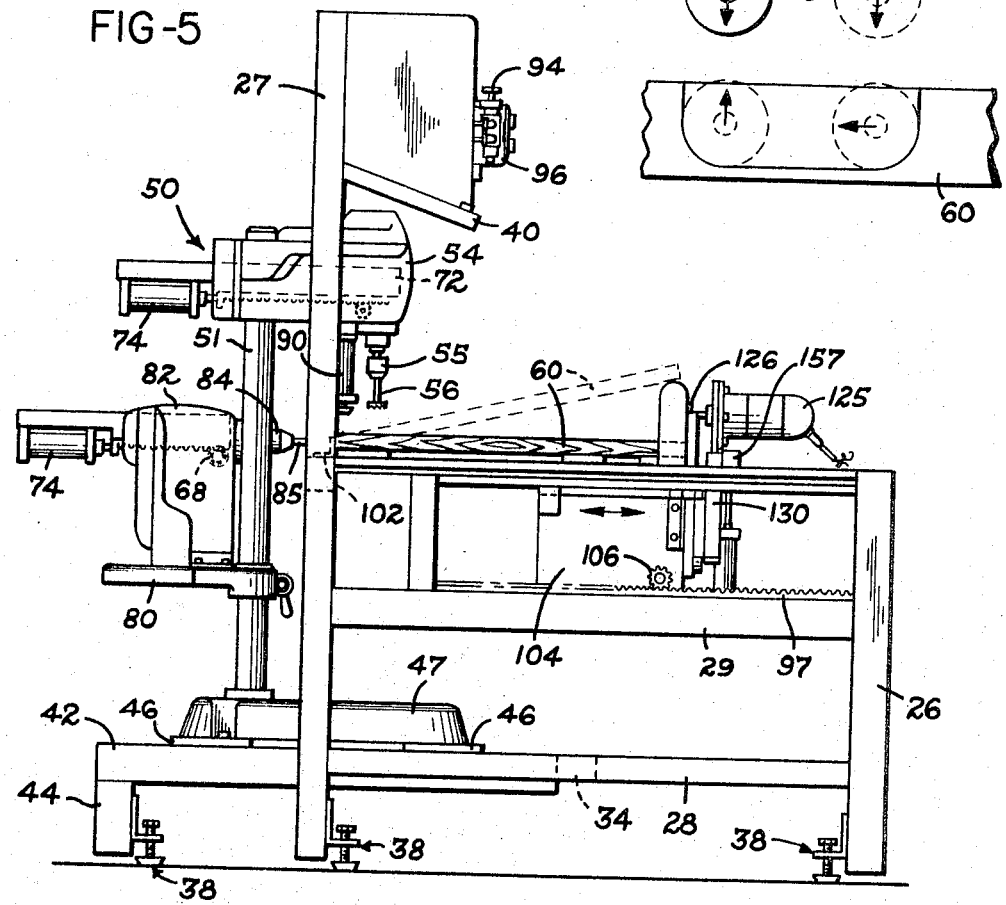
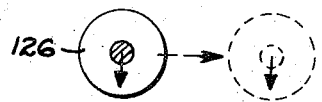
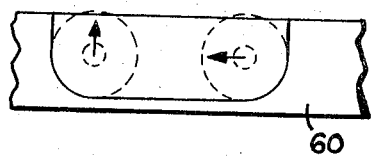
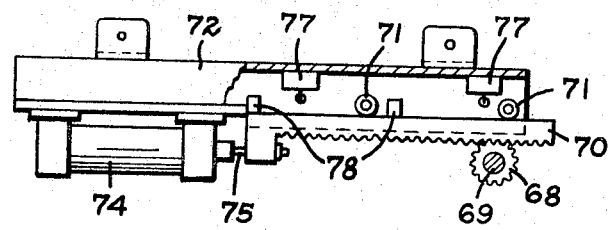

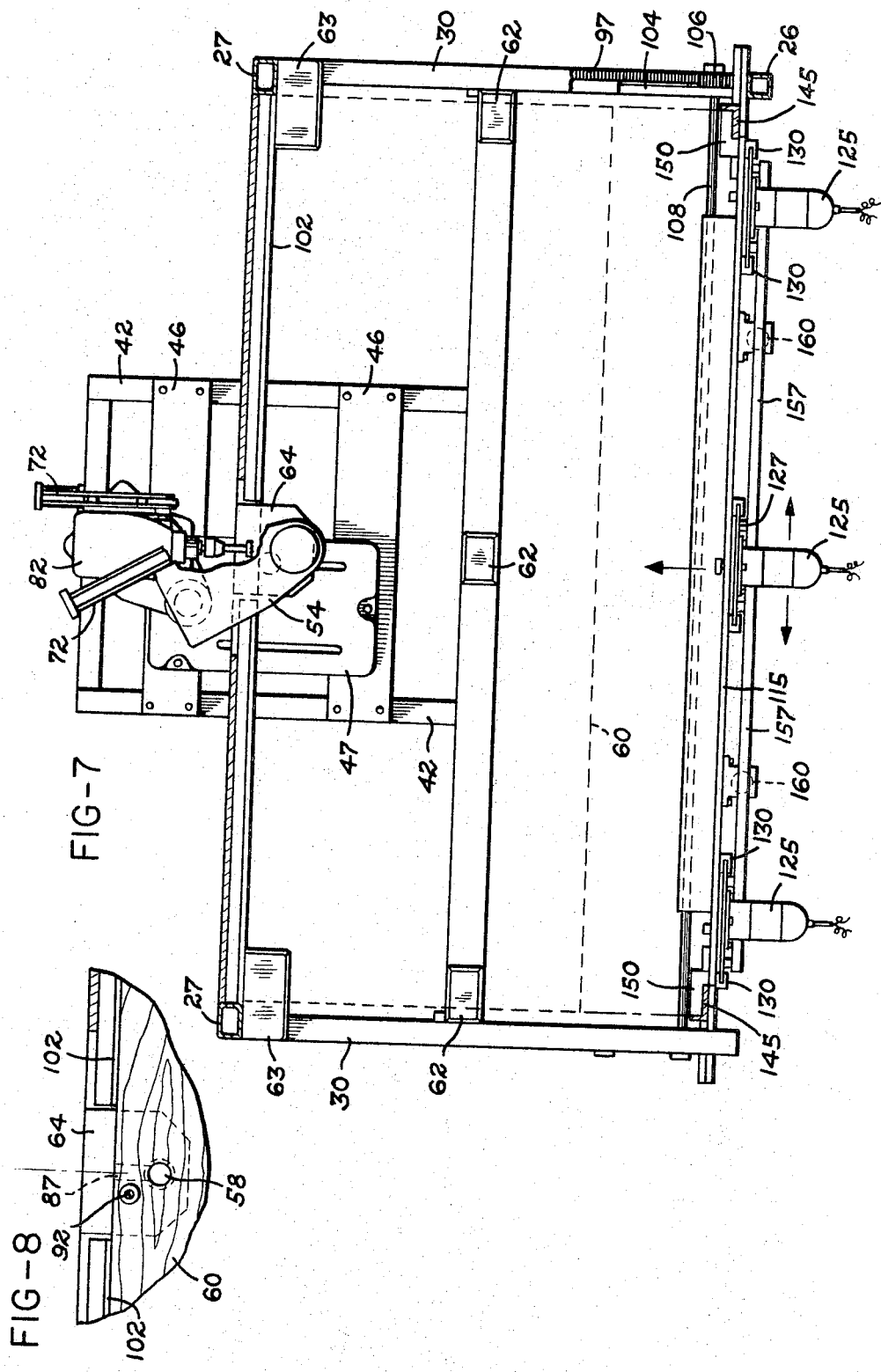

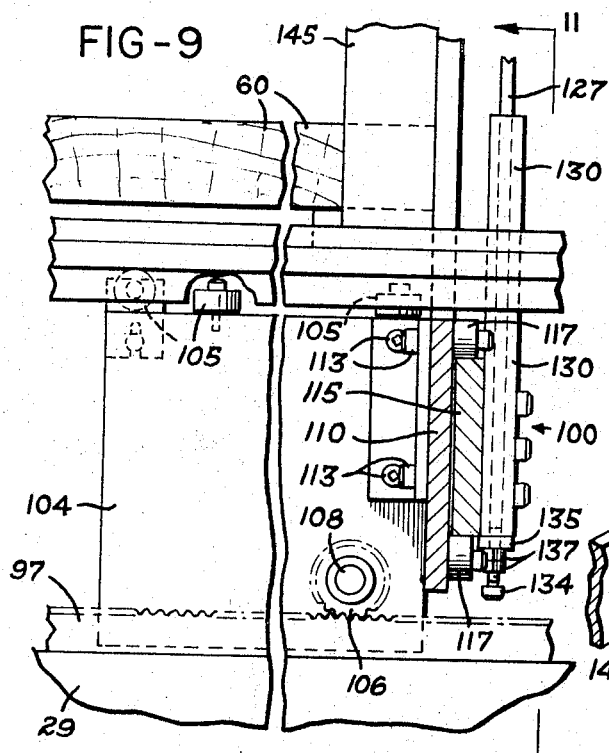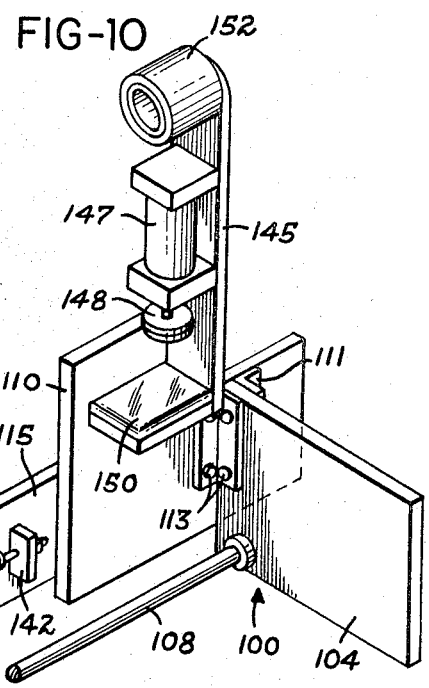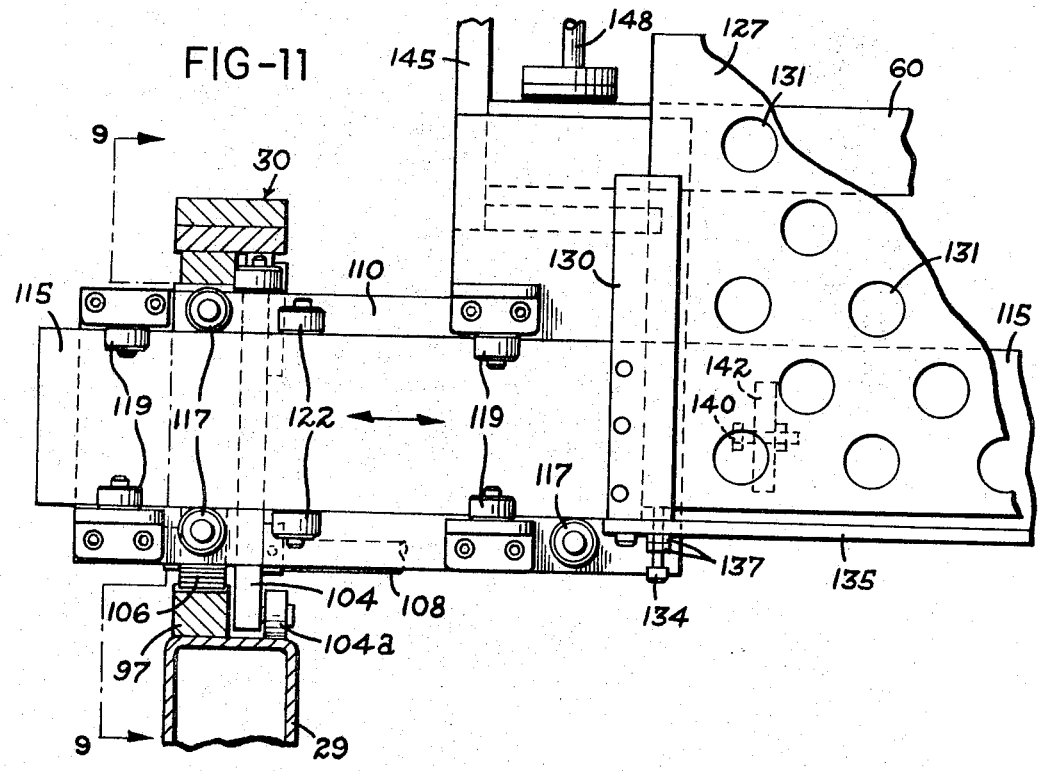

Sept. 5, 1967 C. E. CHRISTMAN ET AL 3,339,601
APPARATUS FOR WOODEN DOORS AND DOORJAMBS
Filed May 7, 1965 7 Sheets-Sheet 5
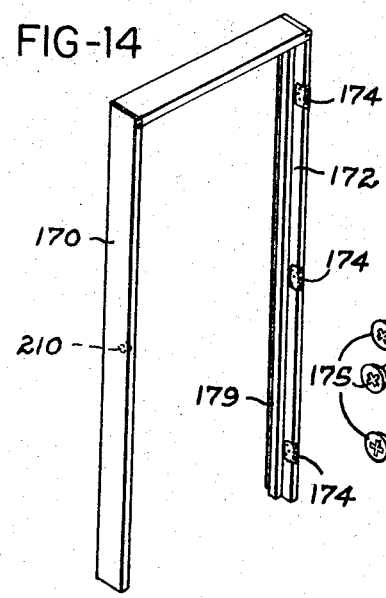
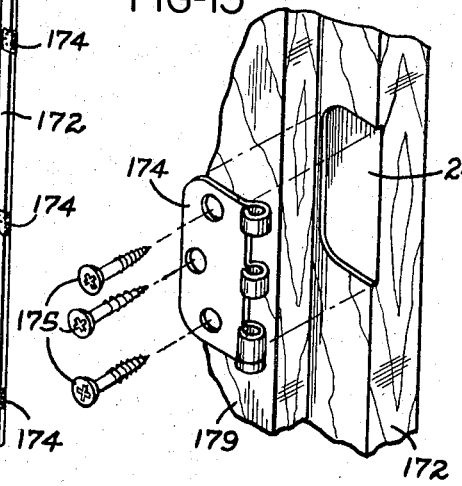
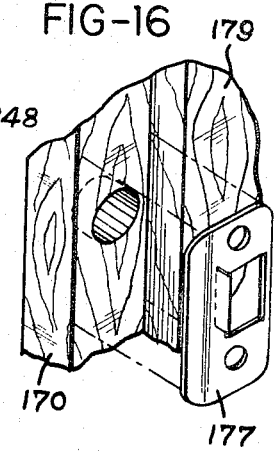
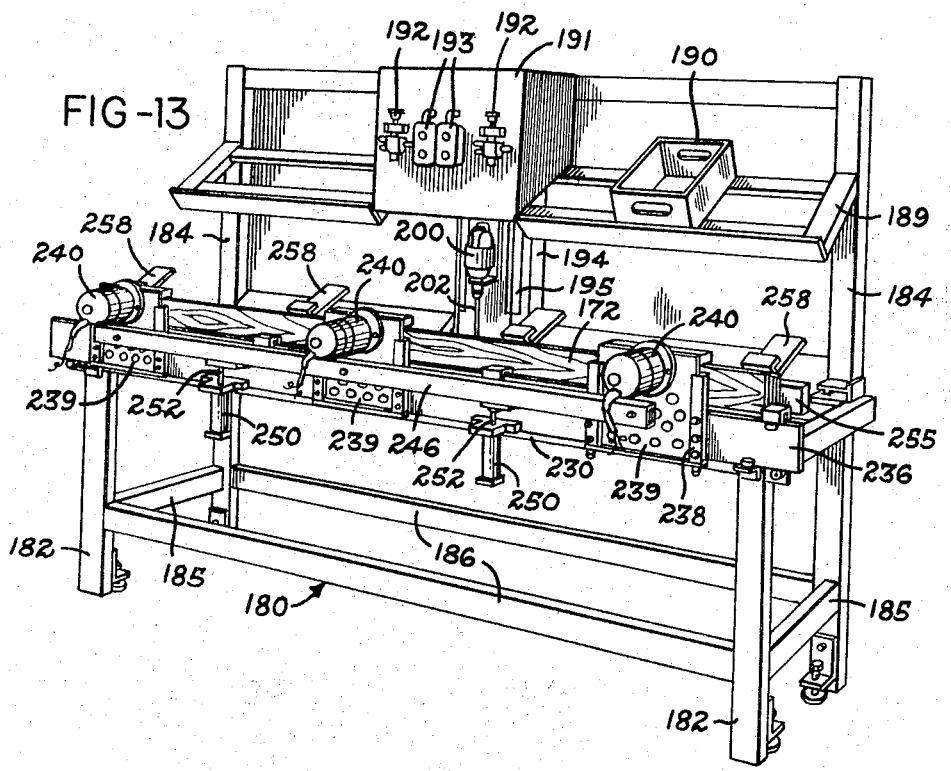

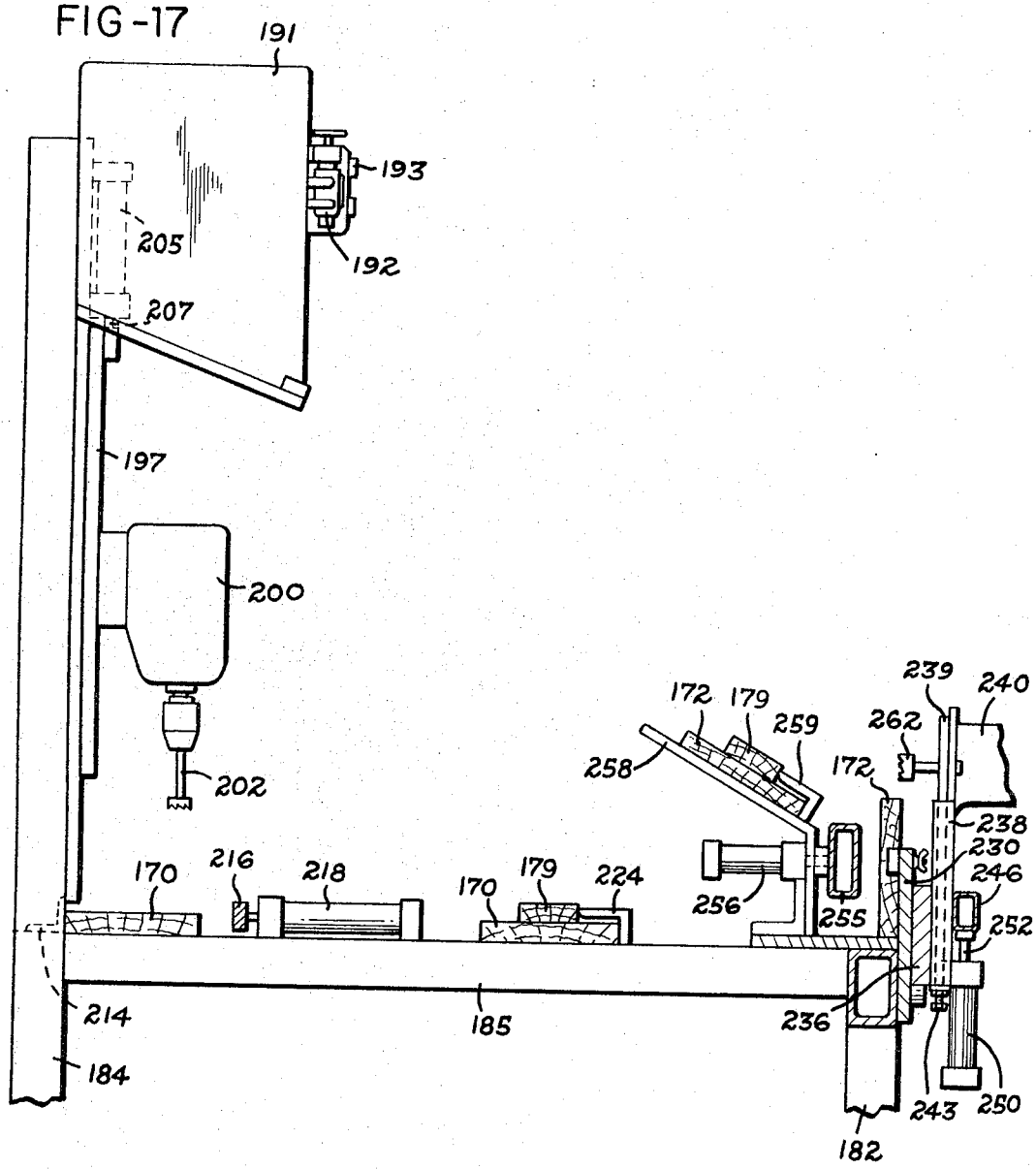

Sept. 5, 1967 C. E. CHRISTMAN ETAL 3,339,601
APPARATUS FOR WOODEN DOORS AND DOORJAMBS
Filed May 7, 1965
7 Sheets-Sheet 7
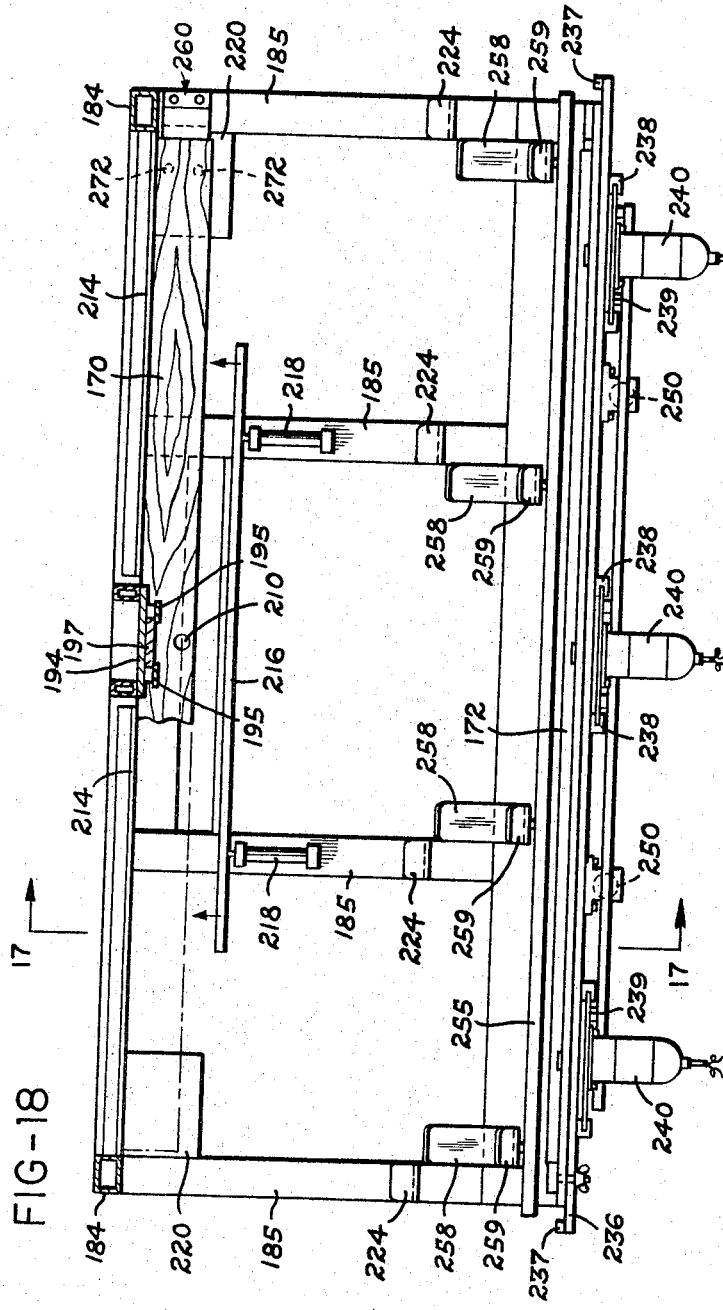
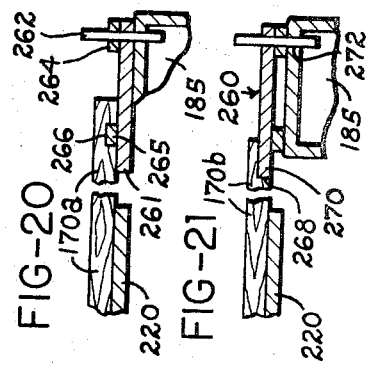
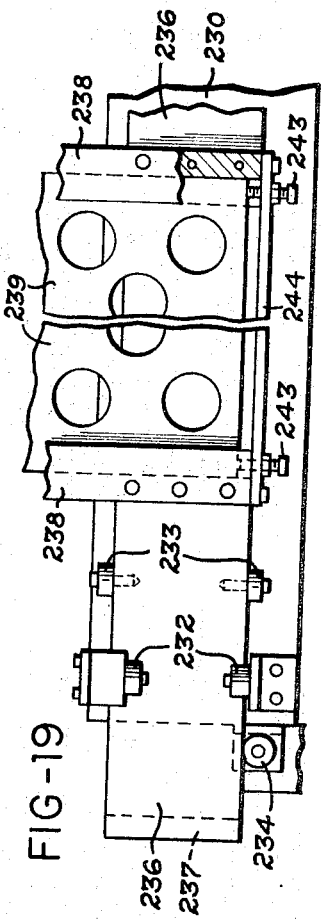

United States Patent Office 3,339,601
Patented Sept. 5, 1967

3,339,601
APPARATUS FOR WOODEN DOORS AND DOORJAMBS
Carl E. Christman and Thomas S. Ferguson, Piqua, Ohio, assignors to Inland Homes Corporation, Piqua, Ohio, a corporation of Ohio
Filed May 7, 1965, Ser. No. 453,985
11 Claims. (Cl. 144—2)

ABSTRACT OF THE DISCLOSURE

A machine for preparing a wooden door and doorjamb to receive the various hardware such as the hinges and latch mechanism. The machine automatically positions the door or doorjamb components and then cuts and drills the appropriate operations to locate precisely the aforesaid hardware.

This invention relates to an apparatus for machining a wooden door and doorjambs, and more particularly, to apparatus for preparing and fixturing the separate components of a wooden door and jamb set for attachment of hardware such as hinges and a latch mechanism.

In one form, the apparatus of the present invention is directed to a machine which semi-automatically prepares a wooden door for the attachment of hinge components and a latch mechanism by providing a series of machining operations which are preformed substantially in sequence. In addition, the apparatus conveniently fixtures the door for the quick attachment of the hinges so that doors can be prepared and assembled at a high rate by a single operator. In another form, the apparatus is adapted to receive and position components which comprise the doorjamb set and to machine the same for the convenient attachment of the doorstop and the latch striker plate. In either form, however, it is a basic purpose of the apparatus according to the invention to provide consistently accurate placement of hardware to reduce hanging problems, as well as to reduce substantially the total time required to prepare the door and jambs and to attach the doorstops, hinges and latch components.

Accordingly, it is a primary object of the present invention to provide an apparatus which is adapted to receive a wooden door and a wooden doorjamb set and to machine or prepare these components after which the components can be quickly positioned on the apparatus for the easily accessible and convenient attachment of the hinge components, doorstops and the latch striker plate in order to make optimum use of the operator's time by performing several operations at one station.

As another object, the present invention provides an apparatus which can receive a wooden door either from above or from the end of the apparatus and is adapted to drill openings within one edge portion of the door for the doorknob spindle and the latch mechanism while at the same time routing either two or three hinge recesses at one time in the opposite edges of the door for the flush mounting of hinge members and, in addition, provide for the positioning of the door in a tilted manner after the preparing operation in order that the hinge members may be quickly and easily attached.

Still another object of the present invention is to provide an apparatus for preparing a wooden door for the attachment of hinge members and latch mechanism, as outlined above, wherein the door is machined for receiving the hinge members by a series of power operated routers adjustably mounted for doors of different thickness and hinge members of different sizes on a carriage which is, in turn, adapted to be easily adjusted horizontally from front to rear to accommodate doors of different widths.

It is also an object of the present invention to provide an apparatus according to another embodiment of the invention wherein the apparatus is adapted to receive, from either above or the end of the apparatus, the components which comprise the door jamb whereby one jamb receives a hole for the latch striker plate while simultaneously the other jamb is being routed for the hinge members and after which, both doorjambs may be conveniently positioned for the attachment of the doorstop, hinge members and striker plate.

A further object of the present invention is to provide an apparatus, as outlined above, which can receive and prepare both doorjambs substantially simultaneously by the use of a power operated drill holder mounted for vertical movement at the rear of the apparatus and a series of power operated routers mounted on a support member for free vertical and horizontal movement at the front of the apparatus in such a manner that the doorjambs may be quickly machined and then fixtured for the immediate assembly of the door hardware and doorstops.

Other objects and advantages will be apparent from the following description, the accompanying drawings and the appended claims.

In the drawings:
FIG. 1 is a perspective view of an apparatus according to one embodiment of the invention showing the general overall construction of the apparatus;
FIG. 2 is a perspective view of a typical wooden door which is prepared and fixtured on the apparatus shown in FIG. 1 for the attachment of the hinge components;
FIG. 3 is an enlarged fragmentary perspective view of a door edge portion which has been prepared for the attachment of a hinge member;
FIG. 4 is a fragmentary perspective view of the opposite edge portion of the door showing the holes which are formed by the apparatus for receiving the latch mechanism;
FIG. 5 is an elevational end view of the apparatus shown in FIG. 1 showing one position for the door during the machining or routing and drilling operation and another inclined position where the hinge components are conveniently attached to the door;
FIG. 6 is an enlarged detailed view of the fluid operated mechanism for automatically extending and retracting the drill press shaft and drill bit;
FIG. 7 is a plan view of the apparatus of FIG. 1 showing the mounting of the drill holders at the rear of the apparatus and the mounting of the power operated routing tools at the front of the apparatus;
FIG. 8 is an enlarged fragmentary plan view of the latch portion of a wooden door showing its position on the support pad located at the rear center of the apparatus and directly under the vertical drill press;
FIG. 9 is an elevational end view in part section of the carriage which supports the routing tools, as viewed along the line 9—9 of Fig. 11;
FIG. 10 is an enlarged detail perspective view of the front left corner of the carriage assembly showing a fluid operated clamping member and support pad which retains and supports a corner of the door;
FIG. 11 is a front elevational view in part section showing the mounting arrangement for one end of the carriage assembly;
FIG. 12 is a fragmentary edge view of a door illustrating a typical path of a router bit which forms a cavity in the edge portion of the door for receiving a hinge member;
FIG. 13 is a perspective view of an apparatus according to another form of the invention and which is adapted to prepare and fixture a doorjamb set for the quick attachment of hardware which mates with the hardware attached to the door prepared on the apparatus shown in FIG. 1;

FIG. 14 is a perspective view of an assembled door frame showing a doorjamb set which is prepared and fixtured for attachment of hardware in the apparatus shown in FIG. 13;

FIG. 15 is a fragmentary perspective view of a doorjamb showing the manner in which a hinge member is assembled to the jamb while the jamb is fixtured on the apparatus of FIG. 13;

FIG. 16 is a fragmentary perspective view of the jamb for the other side of the door showing the mounting arrangement of the latch striker plate which is assembled while the jamb is fixtured on the apparatus shown in FIG. 13;

FIG. 17 is an end elevational view of the apparatus of FIG. 13 showing the position of the doorjamb components during the machining operation and also the fixtured position during the assembly of the doorstop and hardware;

FIG. 18 is a plan view of the apparatus shown in FIG. 13;

FIG. 19 is a front elevational detailed view of the mounting arrangement of the member which supports the power operated routing tools; and FIGS. 20 and 21 are sectional views through the adapter used to position one end of one of the jamb members.

Referring to the drawings, which illustrate preferred embodiments of the invention, FIG. 1 shows one embodiment which is employed to prepare a wooden door for the attachment of the door hardware. In general, this apparatus includes an elongated generally rectangular frame structure 25 comprising two front corner posts 26 connected to two substantially longer rear corner posts 27 by the horizontally arranged cross members 28, 29 and 30. Extending lengthwise as part of the frame structure 25 are a pair of bottom support connecting members 34 and rear connecting members 35 and 36. Mounted to the lower portion of each of the four corner posts 26 and 27 is an adjustable leg 38 which is used for leveling the frame structure 25 and to prevent rocking. Secured to the upper portion of the frame structure 25 and depending downwardly on an angle from the rear corner post 27 is a storage rack 40 which serves as a support for the hardware storage boxes 41 so that the hardware is conveniently placed within arms' reach directly overhead of the frame structure 25.

The cross members 42 are secured to the bottom connecting members 34 and project beyond the rear side of the structure 25 (FIG. 5), and are adapted to be supported from the floor by the end posts 44 and the adjusting legs 38. Connecting the cross members 42 are two flat plate members 46 which serve to support the base 47 of a compound drill press 50 having an upright support post 51.

Mounted near the top of the support post 51 is a drill head 54 having a rotatably mounted drill holder or chuck 55 disposed for rotation about a vertical axis and which retains a drill bit 56 so that the bit may extend downwardly and retract automatically. It is the function of the drill bit 56 to bore the hole 58 in a wooden door 60, as shown in FIGS. 2 and 4, for receiving a conventional doorknob latch spindle (not shown). As shown in FIG. 5, the door 60 is positioned horizontally on the frame structure 25 and is supported thereon by a series of support pads 62 (FIG. 7) which are spaced lengthwise along the center of the frame structure, the support pads 63 which are spaced in the rear corners of the frame structure, and the support pad 64 located at the rear center of the frame structure directly under the drill head 54. Each of the pads 62, 63 and 64 is constructed of Plexiglas or its equivalent so that the doors will not be scratched during operation.

To actuate the raising and lowering of the drill chuck 55, a pinion 68 (FIG. 6) is provided on the feed shaft 69 in place of the conventional lever or hand wheel used on a drill press. Engaging this pinion is a rack 70 which is supported on and guided for linear travel by the rollers 71 fastened to a bracket 72 on the side of the drill head 54. A double acting air cylinder 74 is supported by the bracket 72 and includes a piston rod 75 connected to the end of the rack 70 in order to rotate the feed shaft 69 when fluid pressure is introduced into the cylinder 74. As shown in FIG. 6, a pair of switches 77 are mounted on the bracket 72 and are adapted to be actuated by the two projections 78 extending from the rack 70. The switches 77 serve to control the sequence of the drilling operations, as will be later described.

Also mounted on the support posts 51 of the drill press 50 is a vertically adjustable table 80 which serves to support another drill head 82 having a horizontal axis of rotation. A drill bit 85 is retained within the drill chuck or holder 84 and is adapted to extend and retract in a horizontal direction to bore the hole 87 (see FIG. 4) within the edge of the door 60 to receive a suitable latch mechanism 88. As shown in FIGS. 5 and 7, to precisely position the drill bit 56 within the same vertical plane as the drill bit 85, the drill head 54 and the table 80 are rotated about the axis of the support post 51 into alignment, thus enabling the spindle of the drill head 82 to clear the support post 51.

The fluid operated feed mechanism for the drill head 82 is identical to that described above in connection with the drill head 54 and thus the components thereof are designated by identical reference characters. Thus, as shown in FIGS. 5 and 6, the feed mechanism is mounted on the drill head 82 to feed the bit 85 into the edge of the door 60 by a preset distance and then retract the bit. The switches 77 (FIG. 6) on the feed actuating mechanism, control the timing of the feed operation through suitable solenoid operated pressure valves (not shown) so that the operation of the drill bit 56 (FIG. 5) will immediately follow or precede the drilling operation of the bit 85, and thus prevent the bits from engaging each other within the door 60.

To hold securely the door 60 on the frame structure 25 during the boring operation of the drill bits 56 and 85, a fluid operated clamping cylinder 90 is provided at the rear of the apparatus adjacent the drill bit 56 and includes a piston rod 92 which extends downwardly to clamp the edge of the door against the support pad 64. The clamping cylinder 90 is controlled by a manually operated air valve 94 mounted on the overhead control panel 95. The other switches 96 on the panel 95 control the motors for the drill heads 50 and 82 and also the control valves for one of the air cylinders 74 which starts the sequenital operation of the boring by the bits 56 and 85.

Mounted on the top of each of the two horizontal cross members 29 is a rack 97 (FIG. 11) which cooperate with the carriage assembly 100 (FIG. 1) mounted to move freely from front to rear on the frame structure 25 and to be spaced from the rear stop plate 102 (FIG. 1) a distance which corresponds to the width of the door being machined. The carriage assembly 100 includes a support plate 104 (FIG. 11) disposed at each end of the carriage and supported on the upper surface of the cross member 29 by the rollers 104a mounted for rotation on the plate 104. The rollers 105 mounted on the assembly 100 for guide movement thereof and a pinion 106 which engages the rack 97. The pinion 106 on each end of the carriage is interconnected for common rotation by a shaft 108 (FIG. 10) which extends lengthwise of the carriage, as shown in FIG. 7. By connecting the two pinions 106 together for common rotation, the carriage 100 is prevented from canting in a horizontal plane on the frame structure 25 and will at all times remain parallel with the rear stop plate 102 (FIG. 1).

A front plate 110 is attached to the front edge of each end support plate 104 by the angle brackets 111 and the cap screws 113, as seen in FIGS. 9 and 10. Mounted on the forward face of each front plate 110 and adapted to move freely in a direction lengthwise of the carriage 100 is the support member 115. The rollers 117 on the front plate 110 serve to support the member 115 in a horizontal position, whereas the rollers 119 (FIG. 11) which are also mounted on the front plate 110 serve to hold the support member 115 in a vertical position adjacent the connecting member 110. The rollers 122 which are rotatably mounted on the support member 115 ride on the front plate 110 and thus space the support member 115 slightly in front of the plates 110 to prevent contact, and all of the rollers 117, 119 and 122 cooperate so that the support member 115 is free to move horizontally on the carriage 100 (FIG. 1) in a direction indicated by the arrow in FIG. 11 with the minimum of resistance and friction.

Referring again to FIG. 1, three power operated routing tools 125 having bits 126 (FIG. 5) are each mounted on separate plates 127 which are mounted for sliding vertical movement on the forward face of the support member 115 by the vertically arranged guide channels 130. A series of holes 131 are provided in each of the plates 127 in order to reduce the weight of the plates 127 without a decrease in the rigidity thereof, thus requiring less force to move the routing tools 125 upwardly. As shown in FIG. 11, the downward travel of the plates 127 is limited by the adjustable stop screws 134 threaded into a bottom bracket 135 extending between each pair of guide channels 130. The lock nuts 137 prevent the stop screws 134 from changing position once the downward limit has been set.

As shown in FIG. 10, the horizontal lengthwise movement of the support member 115 is limited by the stop screws 140 which are threaded into the blocks 142 mounted near each end of the support member 115. The end of each stop screw 140 opposite the head is adapted to engage the edge of a front plate 110. Also mounted on each of the plates 110 and extending upwardly therefrom is a bracket 145 which supports the fluid operated clamping cylinder 147 having a piston rod 148 adapted to clamp each forward corner of the door 60 which is supported on the support pads 150 positioned at the level as the support pads 62, 63 and 64 (FIG. 7). Fastened to the top of each of the brackets 145 is a cylindrical support pad 152, preferably formed from a soft resilient material, such as rubber. These pads 152 support the underneath side of the door 60, as shown in FIG. 5, so that the hinge members 155 (FIG. 3) may be conveniently attached to the door 60 by the screws 156.

The three routing tools 125 (FIG. 1) move vertically together as a unit by a connecting bar 157 which is attached to each of the plates 127 by a screw 159. Symmetrically spaced within the center area of the carriage 100 is a pair of fluid operating pressure cylinders 160 mounted on the support member 115 and having a piston rod 162 which engages the underneath side of the connecting bar 157. The pressure within the cylinders 160 is set by a suitable regulating valve (not shown) so that the upward force on the connecting bar 157 acts as a biasing means to counterbalance the combined weight of the routing tools 125, plates 127 and connecting bar 157. By this mounting arrangement, the three routing tools may be smoothly moved with little effort by the operator in both a horizontal and vertical direction so that the routing tools 125 form simultaneously the cavities 165 (FIG. 3) in the edge of the door 60 so that the hinge members 155 can be recessed flush with the surface of the door in a conventional manner.

In operation of the apparatus shown in FIG. 1, the operator pulls the carriage 100 forward and lays a door on the support pads 62–64. The carriage is then moved towards the rear until the forward edge of the door rests upon the support pads 150. The valve 94 is then actuated causing the pistons of clamping cylinders 90 and 147 to extend and clamp the door rigidly to the frame structure 25. By actuating the switches 96, the drill bits 56 and 85 are fed into the door in a successive manner as automatically controlled by the fluid cylinders 74 and the switches 77 to bore the holes 58 and 87 in the edge portion of the door.

Simultaneous with the drilling operation, the operator grips the connecting bar 157 and moves it in a horizontal and vertical direction aided by the pressure cylinders 160 causing the routing bits 126 to move in the directions shown by the arrows in FIG. 12, and thereby machine the cavities 165. The clamping cylinders are then released and the carriage 100 is moved forward after which the front edge of the door 60 is lifted and the carriage is moved underneath so that the support pads 152 engage the underneath side of the door as shown in FIG. 5. The hinge members 155 are then assembled while the door is in this inclined position after which the door is removed and the next unfinished door is placed in position whereupon the above procedure is repeated.

It is within the scope of the invention to use additional pressure cylinders and suitable solenoid operated fluid valves from moving the support member 115 and, when combined with the pressure cylinders 74, 90 and 147 shown herein, the machining operation on each door will be substantially fully automated. Accordingly, the apparatus may be constructed to operate semi-automatically, as shown, or can be constructed to operate fully automatically, whichever is desired for the most efficient use of the operator's time.

Another embodiment of the invention shown in FIGS. 13–17 is adapted to prepare the doorjambs 170 and 172 (FIG. 14) for the attachment of the hinge members 174 on the jamb 172 by the screws 175, and attachment of the latch striker 177 on the jamb 170. The apparatus shown in FIG. 13 also serves to fixture or position both doorjambs in an easily accessible and convenient position for the attachment of the doorstop members 179. This doorjamb machine or apparatus is similar in construction to the door apparatus shown in FIG. 1 and includes a frame structure 180 comprising two front corner posts 182 which are tied to the two longer rear corner posts 184 from front to back by the cross members 185 and from end to end by the connecting member 186.

Mounted on the upper portion of the frame structure 180 is a downwardly extending storage rack 189 which serves to support the storage boxes 190 in which the hardware parts such as the hinge members 174, screws 175, and striker plate 177 are placed for convenient access by the operator. Spaced in the middle of the storage rack 189 is the control panel 191 on which the manual fluid control valves 192 and electrical control switches 193 are mounted for convenient access of the operator.

At the rear of the frame structure 180 are a pair of upright support braces 194 each having a guide channel 195 fastened to the front surface for slidably mounting the plate 197 for vertical movement. Rigidly attached to the mounting plate 197 is a drill head 200 having a chuck 201 (FIG. 17) which can be moved in a vertical direction so that the attached drill bit 202 can be moved into and out of engagement with the jamb 170. A double acting fluid pressure cylinder 205 is mounted rigidly to the top of the upright support braces 194 and includes a piston rod 207 having an end attached to the upper portion of the mounting plate 197. When fluid pressure is supplied to the cylinder 205, the drill bit 202 extends downwardly to bore the hole 210 into the doorjamb 170 (FIG. 17) which is held rigidly to the frame structure 180 against the rear stop member 214 by the clamping bar 216 (FIG. 18) which presses against the edge of the jamb 170 when fluid pressure is supplied to the connecting pressure cylinders 218. The pressure cylinders 218 are controlled by one of the control valves 193 mounted on the control panel 191. The pressure cylinders 218 are mounted on the cross braces 185 which also serve to support the central portion of the jamb 170 having ends resting on the support pads 220.

Also mounted on the top side of the cross braces 185 are a series of angle brackets 224 which are spaced in line and adapted to receive the doorjamb 170 (FIG. 17) and to space a doorstop 179 on the face of the jamb a distance from the edge of the jamb which corresponds in the conventional manner to the thickness of the door. When the doorstop 179 is accurately positioned on the jamb 170 by the fixturing provided by the bracket 224, the doorstop is nailed in place.

As shown in FIGS. 13 and 18, the doorjamb machine includes three routers which are mounted for movement in substantially the same manner as the door machine as described previously. Accordingly, the frame structure 180 includes a front connecting member 230 having the rollers 232, 233 and 234 mounted thereon which guide movement of the support member 236. This roller mounting arrangement permits the support member 236 to travel freely in a horizontal direction with the minimum of resistance but its travel is limited by the stops 237 adjustably secured to the ends of the member 236 and which engage the ends of the connecting member 230. The vertically arranged guide channels 238 are fastened to the support member 236 and serve as a guide for the vertically movable plates 239 on which the routing tools 240 are mounted with a horizontal axis of rotation. The stop screws 243 are threaded into the bottom bracket 244, and extending between each pair of channels 238 to limit the downward travel of the routing tools 240 in the same manner as the stop screws 134, shown in FIG. 11. The connecting bar 246 is attached to each of the plates 239 so that the routing tools 240 move vertically as a unit to route substantially simultaneously the three cavities 248 in the doorjamb 72 which receive the hinge members 174 so that they are flush with the surface of the doorjamb 172.

A pair of fluid pressure cylinders 250 are mounted on the support member 236 and include a piston rod 252 the end of which is mounted to the underneath side of the connecting bar 246. The pressure cylinders 250 serve the same function as the pressure cylinders 160 (FIG. 1) that is, to counterbalance the combined weight of the routing tools 240, plates 239 and connecting bar 236. By counterbalancing the combined weight in this manner, the operator of the apparatus can easily move the routing tools 240 both vertically and horizontally to route simultaneously each of the cavities 248 within the jamb member 172 (FIG. 17). The jamb 172 is held in place for routing by the clamping bar 255 which extends and retracts in a horizontal direction when fluid pressure is introduced into the four pressure cylinders 256 having piston rods connected to the clamping bar 255. These pressure cylinders 256 are actuated by the other control valve 192 mounted on the panel 191.

After the cavities 248 are formed, the doorjamb 172 is removed and placed in an angular position on a series of four rigidly mounted support brackets 258 spaced above the pressure cylinders 256. Extending upwardly from the face of the support 258 are four angle brackets 259 which serve to position the jamb 172 and space the doorstop 179 thereon so that the doorstop can be nailed to the jamb 172 while the jamb is in a convenient position on the apparatus. The depth of a cavity 248 is determined by the position of a routing bit 262 mounted on the spindle of the routing tools 240 and the width of the cavity 248 is determined by the stop screws 243 (FIG. 17) which limit the downward movement of the mounting plate 239 within the channels 238.

The adjustable stop member 260 is disposed on one of the channel members 185 at the end of the jamb member 170 to engage the top end of this member 170 and position the same so that the hole 210 is bored at the proper place. The member 260 is shown in FIGS. 18, 20 and 21 and includes a flat plate 261 having a pair of pins 262 rigidly secured near one end thereof and extending above and below the plate 261. A spacer 264 is provided on one side of the plate, and the upstanding projection 265 is also provided on this side so that it will engage the groove 266 in the interior jamb member 170a.

When the apparatus is being used to produce exterior doorjambs, wherein the top of the jamb member 170b (FIG. 21) has a cutout portion 268 rather than a groove 266, the stop member 260 is removed and turned over so that it assumes the position shown in FIG. 21. In this position, the surfaces of the cutout portion 268 engage the end portion 270 of the stop member to accurately position the jamb member 170b. The spacer 264 and the projection 265 position the plate 261 evenly above the surface of the channel 185. Two pairs of apertures 272 are provided at each end of the apparatus for receiving the pins 262 so that the member 260 may be used at two different locations at each end of the machine thereby allowing left and right-hand jamb members of different lengths to be processed thereby. Consistent with a basic advantage of the invention, this feature provides for flexibility in operation of the apparatus while permitting consistent high quality products to be produced thereon.

In operation of the apparatus shown in FIG. 13, an unfinished jamb 170 is placed face down in a horizontal position along the rear of the apparatus (FIG. 17) and an unfinished jamb 172 is placed on edge in a horizontal position along the front of the apparatus. The switches 193 and valves 192 are then actuated causing the fluid operated bars 216 and 255 to extend and clamp the jambs 170 and 172, after which, the drill bit 202 extends downwardly to bore the hole 210 in the jamb 170. Simultaneously, the operator may grip the bar 246 and move the routing tools 240 both vertically and horizontally to machine the cavities 248 in the jamb 172. After the clamping bars 216 and 255 are released, the jambs 170 and 172 are repositioned within the fixturing brackets 224 and 259 respectively where the doorstops 179 are fastened by suitable nails or the like and also the hinge members 174 and latch plate 177 are attached to the jambs 172 and 170 respectively. The finished jambs are then removed and another set of unfinished jambs are placed on the apparatus.

By providing both a machining station and a fixturing station for each doorjamb on the apparatus according to the invention, the doorjambs can be efficiently prepared and assembled by one operator with minimum utilization of the operator's time. For example, while the jamb 170 is receiving a hole 210 by the drill bit 202, another jamb 170 can be fixtured in the brackets 225 for receiving a latch plate 177 and a doorstop 179 which is attached in place by suitable nails or screws. By this arrangement, it has been found that an operator of the apparatus can make optimum use of his time. Furthermore, since the apparatus can be used to prepare the doorjambs and also fixture the doorjambs for the assembly of the doorstops and hardware, it is not necessary to transfer the doorjambs to another apparatus for assembly of the hinge members, striker plate and doorstops.

This same advantage results from the use of the apparatus shown in FIG. 1. That is, since the door 60 may be tilted and positioned on the support pads 152 where the hinge members 155 may be conveniently and easily attached, it is unnecessary to move the door to another station and reposition the door for the attachment of the hinge members 155. In fact, immediately after the door is drilled and routed, the operator can easily pull the carriage 100 forward and then lift the forward edge of the door 60 so that the carriage may be moved rearwardly and the supporting pads 152 engage the underneath side of the door 60. The operator then takes the hinge members 155 and screws 156 from the container 41 and attaches the hinge members before the door is removed from the apparatus.

Another important feature of having the routing tools 125 mounted on the carriage 100 is that the apparatus can be used on any of the several standard width doors without making adjustments of any type. Furthermore, with doors of different thicknesses, it is easy to adjust the bottom limit of travel of the routing tools 125 simply by adjusting the stop screws 134. The vertical setting of the drill bit 85 can also easily be adjusted by adjusting the table 80 on the support 51. If a different length hinge member 155 is used, the length of the cavity 165 can easily be adjusted by the stop screws 140 (FIG. 10). In addition, since the clamping cylinders 90 and 147 are supplied with fluid at a constant pressure, no adjustment of the clamps is necessary when doors of different thicknesses are placed on the apparatus as the clamping piston rods 92 and 148 will clamp the door with a force which is the same at any level.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An apparatus for preparing wooden door components for the attachment of hinges, comprising a frame structure having means for supporting a door component, clamping means for rigidly securing the components to said frame structure so one edge of the door component is disposed in a predetermined position, an elongated support member slidably secured to said frame structure for free horizontal movement back and forth on said frame structure parallel to the one edge of the door component, a plurality of router support plates mounted at spaced intervals along the length of said support member and adapted to move vertically thereon perpendicular to the one edge portion of the door component, a power routering tool secured to each said support plate each with its axis of rotation insubstantially the same horizontal plane, connecting bar means fastened to each of said router support plates for moving said tools simultaneously as a unit in a vertical direction to route the one edge portion of the door component thereby to receive the hinges, and bias means for assisting the smooth movement of said routering tools in a vertical direction.

2. An apparatus for preparing and fixturing wooden door components for the attachment of hinges, comprising a frame structure having means for supporting a door component, fluid operated clamping means for rigidly securing the components to said frame structure so one edge of the door component is disposed in a predetermined position, an elongated support member slidably secured to said frame structure for free horizontal movement back and forth on said frame structure parallel to the one edge of the door component, a plurality of power routering tools secured to said support member at spaced intervals along the length of said support member and each with its axis of rotation in substantially the same horizontal plane, means for moving said tools simultaneously as a unit in a vertical direction perpendicular to the one edge portion of the door component to route the edge portion thereby to receive the hinges, fluid operated cylinder means for assisting the smooth movement of said routering tools in a vertical direction, and means for fixturing the door components for the convenient attachment of the hinges.

3. An apparatus for preparing and fixturing wooden door components for the attachment of hinges, comprising a frame structure having means for supporting a door component, fluid operated clamping means for rigidly securing the components to said frame structure so one edge of the door component is disposed in a predetermined position, an elongated support member slidably secured to said frame structure for free horizontal movement back and forth on said frame structure parallel to the one edge of the door component, a plurality of router support plates mounted at spaced intervals along the length of said support member and adapted to move vertically thereon perpendicular to the one edge portion of the door component, a power routering tool secured to each said support plate each with its axis of rotation in substantially the same horizontal plane, connecting bar means fastened to each of said router support plates for moving said tools simultaneously as a unit in a vertical direction to route the one edge portion of the door component thereby to receive the hinges, fluid operated cylinder means for assisting the smooth movement of said routering tools in a vertical direction, and means for fixturing the door components for the convenient attachment of the hinge.

4. An apparatus for preparing and fixturing wooden door components for the attachment of hinges and latch mechanism comprising a frame structure having means for supporting a door component, fluid operated clamping means for rigidly securing the components to said frame structure so the component is disposed in a predetermined position, a power operated drill holder rigidly positioned at the rear of said frame structure, means for mounting said drill holder for vertical movement to bore a hole in a component, fluid operated pressure cylinder means adapted to advance and retract said drill holder, an elongated support member slidably secured to said frame structure for free horizontal movement back and forth on said frame structure parallel to the one edge of the door component, a plurality of router support plates mounted at spaced intervals along the length of said support member and adapted to move vertically thereon perpendicular to the one edge portion of the door component, a power routering tool secured to each said support plate each with its axis of rotation in substantially the same horizontal plane, connecting bar means fastened to each of said router support plates for moving said tools simultaneously as a unit in a vertical direction to route the one edge portion of the door component thereby to receive the hinges, fluid operated cylinder means for assisting the smooth movement of said routering tools in a vertical direction, and means for fixturing the door components for the convenient attachment of the hinge and latch mechanism.

5. An apparatus for preparing a wooden door for the attachment of hinge components and latch mechanism, comprising an elongated frame structure having means for supporting the door in a horizontal position during a drilling and routering operation, clamping means for rigidly securing the door in said horizontal position on said frame structure, first power operated drill means positioned at the rear of said frame structure, means for supporting and moving said first drill means vertically to bore a first hole in the door for receiving a doorknob spindle, second power operated means holder positioned at said rear of said frame structure, means for mounting said second drill means for horizontal movement to bore a second hole in the edge of the door perpendicular and in connection with the first hole for receiving the latch mechanism, pressure cylinder means adapted to advance and retract said first and second drill means independently of each other, a carriage assembly, means mounting said carriage assembly for horizontal movement toward and away from the rear of said frame structure so that said carriage will accommodate doors having different widths, said carriage assembly including a horizontally disposed support member, means for mounting said support member for free horizontal movement lengthwise of said carriage and parallel to the length of said door, a plurality of power operated routering tools, means for mounting said tools for vertical movement on said support member, and connecting bar means fastened to each of said tools causing said tools to move as a unit in a vertical direction within predetermined limits for simultaneously routering the door edge for receiving the hinge components.

6. An apparatus for preparing a wooden door for the attachment of hinge components and latch mechanism, comprising an elongated frame structure having means for supporting the door in a horizontal position during a drilling and routering operation, clamping means for rigidly securing the door in said horizontal position on said frame structure, first power operated drill means positioned at the rear of said frame structure, means for supporting and moving said first drill means vertically to bore a first hole in the door for receiving a doorknob spindle, second power operated drill means positioned at said rear of said frame structure, means for mounting said second drill means for horizontal movement to bore a second hole in the edge of the door perpendicular to and in communication with the first hole for receiving the latch mechanism, pressure cylinder means adapted to advance and retract said first and second drill means independently of each other, a carriage assembly, means for mounting said carriage assembly for horizontal movement toward and away from the rear of said frame structure so that said carriage will accommodate doors having different widths, said carriage assembly including a horizontally disposed support member, means for mounting said support member for free horizontal movement lengthwise of said carriage and parallel to the length of said door, a plurality of power operated routering tools, means for mounting said tools for vertical movement on said support member, and connecting bar means fastened to each of said tools causing said tools to move as a unit in a vertical and horizontal direction within predetermined limits for simultaneously routering the door edge for receiving the hinge components.

7. An apparatus for preparing a wooden door for the attachment of hinge components and latch mechanism, comprising an elongated frame structure having means for supporting the door in a horizontal position during a drilling and routering operation, clamping means for rigidly securing the door in said horizontal position on said frame structure, first power operated drill means positioned at the rear of said frame structure, means for supporting and moving said first drill means vertically to bore a first hole in the door for receiving a doorknob spindle, second power operated drill means positioned at said rear of said frame structure, means for mounting said second drill means for horizontal movement to bore a second hole in the edge of the door perpendicular to and in communication with the first hole for receiving the latch mechanism, pressure cylinder means adapted to advance and retract said first and second drill means independently of each other, a carriage assembly, rack means mounted in a horizontal position at each end of said frame structure, interconnected pinion means mounted on said carriage assembly and adapted to engage said rack means to provide for parallel horizontal movement of said carriage assembly toward and away from the rear of said frame structure so that said carriage will accommodate doors having different widths, said carriage assembly including a horizontally disposed support member, means for mounting said support member for free horizontal movement within predetermined limits lengthwise of said carriage and parallel to the length of said door, a plurality of power operated routering tools connected to said support member, and means for mounting said tools for movement as a unit in a vertical direction within predetermined limits for simultaneously routering the door edge for receiving the hinge components.

8. An apparatus for preparing and fixturing a wooden door for the attachment of hinge components and latch mechanism, comprising an elongated frame structure having means for supporting the door in a horizontal position during a drilling and routering operation, fluid operated clamping means for rigidly securing the door in a horizontal position to said frame structure, a first power operated drill holder positioned at the rear side of said frame structure, means for mounting said first drill holder for vertical movement to bore a hole in the door for receiving a doorknob spindle, a second power operated drill holder positioned at the rear of said frame structure, means for mounting said second drill holder for horizontal movement to bore a hole in the door edge adapted to receive a latch mechanism, pressure cylinder means adapted to advance and retract said first and second drill holders independently of each other, a carriage assembly, means for mounting said carriage assembly for horizontal movement across the front portion of said frame structure and for spacing from said first drill holder a distance corresponding to the width of the door, said carriage assembly including a horizontally disposed support member, means for mounting said support member for free horizontal movement lengthwise of said carriage, a plurality of power operated routering tools, means for mounting said tools for independent vertical movement on said support member, and connecting bar means fastened to each of said tools causing said tools to move as a unit in a vertical direction for simultaneously routering the door edge for receiving the hinge components.

9. An apparatus for preparing and fixturing a wooden door for the attachment of hinge components and latch mechanism, comprising an elongated frame structure having means for supporting the door in a horizontal position during a drilling and routering operation, a clamping means for rigidly securing the door to said frame structure, a first power operated drill holder mounted for vertical movement at the rear of said frame structure and adapted to bore a hole in the door for receiving a doorknob spindle, a second power operated drill holder mounted for horizontal movement at said rear of said frame structure and adapted to bore a hole in the door edge for reeciving a latch mechanism, pressure cylinder means adapted to advance and retract said first and second drill holders independently of each other, a carriage assembly mounted for horizontal movement toward and away from said rear of said frame structure and adapted to be adjustably spaced from said first drill holder a distance corresponding to the width of the door, said carriage assembly including a support member mounted for horizontal movement lengthwise of said carriage assembly parallel to the edges of the door, power operated routering tool means mounted for vertical movement on said support member, a connecting bar secured to each of said tools and causing said tools to move as a unit in horizontal and vertical directions to route the door for receiving the hinges.

10. An apparatus for preparing and fixturing a set of wooden doorjambs for the attachment of hinge components and striker plate, comprising an elongated frame structure having means for supporting the jambs in a horizontal position during a drilling and routering operation, clamping means for rigidly securing the jambs in a horizontal position to said frame structure, a power operated drill positioned at the rear side of said frame structure, means for mounting said drill for vertical movement to bore a hole in one of the jambs for receiving the striker plate, power cylinder means for advancing and retracting said drill, a horizontally disposed support member, means for mounting said support member for free horizontal movement lengthwise of said structure, a plurality of power operated routering tools, means for mounting said tools for independent vertical movement on said support member, and connecting bar means fastened to each of said tools causing said tools to move as a unit in a vertical direction and said support in a horizontal direction for simultaneously routering separate cavities in the other jamb for receiving the hinge components.

11. An apparatus for preparing and fixturing a set of wooden doorjambs for the attachment of doorstops and hardware including hinge components and latch striker plate, comprising an elongated frame structure having means for supporting each jamb in a first horizontal position for the machining operation and in a second horizontal position for the convenient attachment of the doorstops and hardware, fluid operated clamping means for rigidly securing the jamb to said frame structure in said first position, a power operated drill holder positioned at the rear side of said frame structure means for mounting said drill holder for vertical movement to bore a hole in one of the jambs for receiving a latch strike, pressure cylinder means for advancing and retracting said drill holder, a horizontally disposed support member, means for mounting said support member for free horizontal movement lengthwise of said structure, a plurality of power operated routering tools, means for mounting said tools for independent vertical movement on said support member, and connecting bar means fastened to each of said tools causing said tools to move as a unit in a vertical direction for simultaneously routering separate cavities in the other jamb for receiving the hinge components.

References Cited

UNITED STATES PATENTS

| | | | |
|---|---|---|---|
| 2,656,862 | 10/1953 | Gellert et al. | 144—2 X |
| 2,790,470 | 4/1957 | Graham | 144—27 X |
| 2,945,520 | 7/1960 | Grubb | 144—27 |
| 3,263,718 | 9/1966 | Carmichael et al. | 144—3 |
| 3,263,723 | 9/1966 | Sheffield et al. | 144—27 X |
| 3,280,863 | 10/1966 | Sturgis | 144—2 X |

WILLIAM W. DYER, Jr., *Primary Examiner.*

W. D. BRAY, *Assistant Examiner.*